Patented Feb. 6, 1940

2,188,951

UNITED STATES PATENT OFFICE 2,188,951

INSECTICIDE

Armin Joseph Kraus, Jersey City, N. J., assignor to The Richards Chemical Works, Incorporated, Jersey City, N. J., a corporation of New Jersey No Drawing. Application February 8, 1939, Serial No. 255,234

7 Claims. (Cl. 167—30)

My invention relates to an improved insecticide and fungicide and to the process of producing the same.

One object of my invention is the production of highly dispersed colloidal emulsions and practically indefinitely stable aqueous suspensions of insecticidal and bactericidal compositions which in themselves are insoluble in water.

Another object of my invention is to produce compositions of this general character particularly suitable in the preparation of sprays for exterminating animal and vegetable pests.

Before proceeding to give a detailed description of my invention I deem it desirable to set out certain of the properties, uses and characteristics of a spray prepared in accordance with my invention.

My improved spray acts effectively as a repellent in the prevention of certain fungus diseases; as an insecticide in that it exterminates insects, preventing the latter from destroying foliage; and as a disinfectant in the destruction of certain bacteria. As typifying the insects, and their eggs, which are killed by my novel spray, I mention the following: red spider, leaf roller, green aphis, wooly aphis, San José scale, apple scale, coddling moth, boring worms, etc.

An important factor respecting the invention is that the spray composition is neutral in character and, as a consequence, it will not have the slightest injurious effect on fruits, trees, plants or grass, or even on the most tender leaves, buds or flowers.

Other characteristics which render my improved spray superior to many sprays heretofore employed are the following:

First. It will penetrate more deeply into the foliage and branches than any other spray known to me.

Second. In penetrating, it will not only be absorbed but also adsorbed, thus obviating damage to the life and growth of the plants under treatment.

Third. The spray is biochemically assimilated by the growing organic and undergoes neither decomposition nor conversion in this process. As a consequence, the composition maintains its original toxic strength and renders the foliage, branches, bark, etc., inedible by all kinds of parasitic insects and the like.

Fourth. Due to its lasting toxicity, even after evaporation of any diluent employed, the spray prevents the laying and hatching of insects' eggs or larvae of embryonic life in the foliage.

Fifth. The spray is both a contact poison and a stomach poison thus giving double assurance of insect destruction.

Sixth. The spray is of relatively slight volatility and, therefore, its odor is a strong, lasting repellent.

Many forms of insecticidal and fungicidal compositions have been heretofore proposed but, so far as I am aware, none has proven entirely satisfactory and efficient for the intended purpose.

Sulphur and copper in various forms have been widely used in preparing such compositions, the sulphur being applied as such either in mechanical suspension in an oily or aqueous medium, or in the form of a salt dissolved in water, and the copper being used only in the form of its salts either in suspension or solution.

It has also been proposed to use various hydrocarbon derivatives of petroleum and tar oils, possessed of toxic properties, in the manufacture of insecticides and fungicides. Likewise, it has been proposed to use both groups of the raw materials, mentioned above, in the form of suspensions or solutions of the mineralic salts in the oils, rendered emulsifiable with water through the presence of a soap.

As distinguished from prior art procedure, the method of my invention comprises sulphurizing the lighter fractions of tar oil rich in carbolic acid, together with naphthenic acids and converting the resulting sulphurization products into copper salts.

The final product of this reaction constitutes the composition of my invention.

In carrying my invention into practice the sulphurization step is performed in the manner customary in this art, and at the lowest possible temperature at which a fairly light colored product with a structural sulphur content up to 12% is obtained. The batch or mixture to be sulphurized consists of light tar oil and naphthenic acids in the ratio of 1:3, and to this batch about 15% of sublimated sulphur is added.

The whole mixture, as above described, is allowed to settle for approximately twelve hours after which it is cooled down slowly for approximately forty-eight hours. During this time all the dissolved free sulphur is precipitated in the form of fine crystals and, after filtration the oil is blown with warm air for forty-eight hours to free the oil from the absorbed sulphurous gases, principally sulphur dioxide.

The next step in the method consists in converting the sulphurization product into copper salts, which is desirably done as follows: 100 lbs. of the sulphurized oil or mixture and 50 pounds of water are charged into a steam-jacketed kettle, agitation is turned on and the temperature is brought to about 85° C. Then 35 pounds of caustic soda lye of 38° Bé. are added slowly and the kettle temperature is raised to 95-97° C., at which saponification is completed and the product is a heavy bodied yellowish brown soap.

The copper salt solution to be incorporated in the soap, above described, is prepared by dissolving 25 pounds of commercial copper sulphate crystals in 150 pounds of water heated to about 70° C., in a wooden tank equipped with a steam pipe.

The hot copper salt solution is now worked into the soap batch and the temperature in the kettle is held around 80-85° C., until the soft sodium soap can find no more copper sulphate for conversion into a dark green copper soap floating on the surface of the batch. At this point, heat and agitation are discontinued, the batch allowed to settle for two hours and the bulk of the water drawn off. Any remaining acid water retained in the soap is recovered either by maceration or centrifuging.

To form the final insecticidal spray I charge

| | Pounds |
|---|---|
| Copper salts | 48 |
| Kerosene | 25 |
| Light mineral oil | 25 |
| Triethanolamine | 2 |
| | 100 | into a kettle, turn on the agitation and heat up to about 65° C. After the mixture is complete, heat is discontinued and the batch cooled down to room temperature in the presence of agitation.

The relatively small quantity of copper employed is not, obviously, sufficient to cause complete conversion of all the sodium soaps and therefore enough unchanged sodium soaps are retained to render the final soap composition emulsifiable in water, especially in the presence of the triethanolamine.

I use kerosene and light mineral oil as natural diluents which serve, long after the water has evaporated, as dispersing agents for the naphthenics and water insoluble salts present in a colloidal state in the watery emulsion. The kerosene and light mineral oil also considerably retard the final decomposition of certain components effected by the $CO_2$ of the air, thus prolonging the strong, lasting repellent activity of the decomposed, lighter, volatile parts. It is also evident that as the carbolic acids are not present in the free state, but in the form of colloidally dispersed salts, decomposition of the composition is further retarded and its efficacy prolonged.

It is well known that all copper naphthenates are highly stable and chemically resistant to air and moisture; they never dry out completely as do the widely used inorganic copper salts, but on the contrary they have a decided absorptive power for moisture, thus providing a considerable increase of natural adhesion strength.

The naphthenics likewise have pronounced wetting out capability, which results in quick and deep penetration of the composition into the bark and branch interstices and the thorough saturation of the plant. Sodium naphthenate has the lowest hydrolization coefficient of all the soaps and is therefore especially adapted to most effectively carry the other colloidal salts into the cellular structure of the foliage without causing any destructive reactions, as is invariably done with soaps of vegetable oil or animal fat derivation. The vegetable oil or animal fat soaps are soon split into their components and the undesirable effect of free fatty acids and free alkalies on leaves is quickly apparent.

It will be noted from the foregoing description that the product of my invention is a composition of a highly complex structural nature, containing sodium and copper naphthenates, sodium and copper carbolates (phenolates), as well as many combinations of the same in the form of double salts and, to a considerable extent, the complex character of the composition is the reason for its high, practically universal insecticidal qualities.

I do not desire to be limited to the details described above, which are given for the purpose of rendering the disclosure complete, and it will be understood that various modifications in details and procedure may be made without departing from the spirit of the invention as defined by the appended claims.

In describing the manner in which my invention is carried into practice I have specified certain components and their proportions and the following examples will further illustrate the components, with their proportions, which may be employed in producing the base of my novel insecticide:

*Example 1*

| | Pounds |
|---|---|
| Sulphur | 15 |
| Light crude tar oil (soft coal derivative) | 25 |
| Mid-Continent naphthenic acids | 75 |
| Water | 50 |
| Caustic soda lye 38° | 35 |
| Copper sulphate | 25 |
| Water | 150 |

*Example 2*

| | Pounds |
|---|---|
| Sulphur | 15 |
| Natural carbolic acid (technical grade) | 15 |
| Russian naphthenic acid derived from Baku crude | 85 |
| Water | 70 |
| Caustic soda lye 42° | 40 |
| Copper sulphate | 30 |
| Water | 180 |

*Example 3*

| | Pounds |
|---|---|
| Sulphur | 10 |
| Synthetic or natural cresylic acid | 5 |
| Light crude tar oil | 10 |
| Naphthenic acids derived from Roumanian crude | 60 |
| Water | 45 |
| Caustic soda lye 40° | 37 |
| Copper sulphate | 32 |
| Water | 180 |

I claim:

1. An insecticide and fungicide containing as its active ingredients the complex copper salts of sulphurized cresylic acids and naphthenic acids.

2. An insecticide and fungicide comprising the sulphurized reaction product of a mixture of saponified cresylic acids and naphthenic acids with copper sulphate.

3. An insecticide and fungicide consisting of the product of claim 2 colloidally emulsified in a liquid vehicle.

4. An insecticide and fungicide consisting of the product of claim 2 emulsified with sodium naphthenate and carried colloidally in a liquid vehicle consisting of light mineral oil and kerosene.

5. An insecticide and fungicide consisting of the product of claim 2 emulsified with triethanolamine and carried colloidally in a liquid vehicle consisting of light mineral oil and kerosene.

6. An insecticide and fungicide comprising the reaction product of sulphurized naphthenic acids, sulphurized cresylic carbolic acids and copper sulphate.

7. The herein described process of producing an insecticide and fungicide, comprising sulphurizing a mixture of naphthenic acids and the lighter fractions of tar oil rich in carbolic acid, saponifying the resulting product and reacting a copper salt solution with the saponified sulphurization product to form a copper salt.

ARMIN JOSEPH KRAUS.